Feb. 17, 1925.
J. N. DOYON
1,527,033
BRAKE BAND OPERATING MECHANISM
Filed Nov. 21, 1923
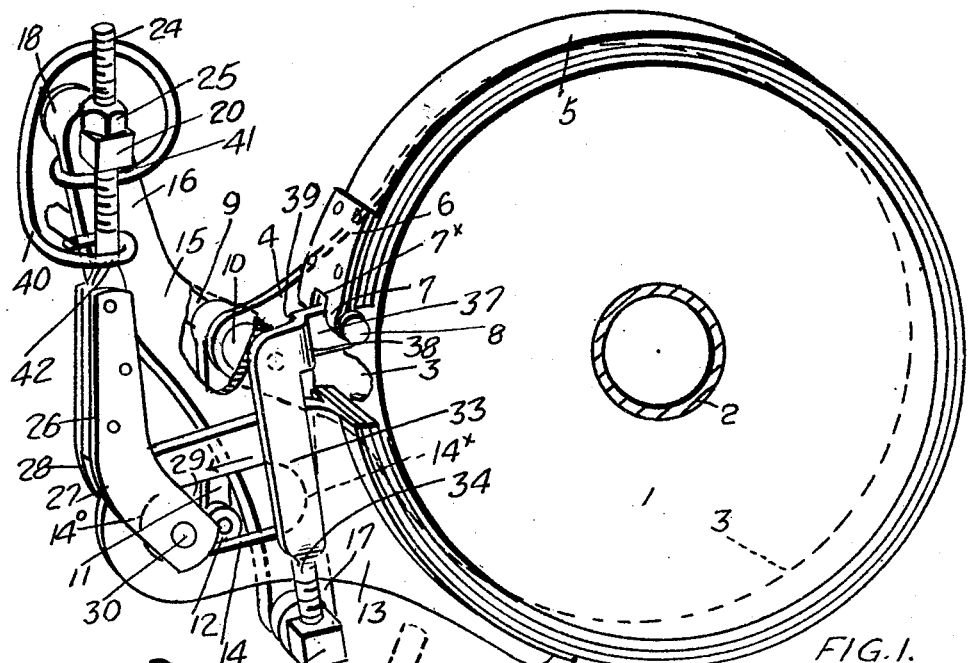
FIG.1.
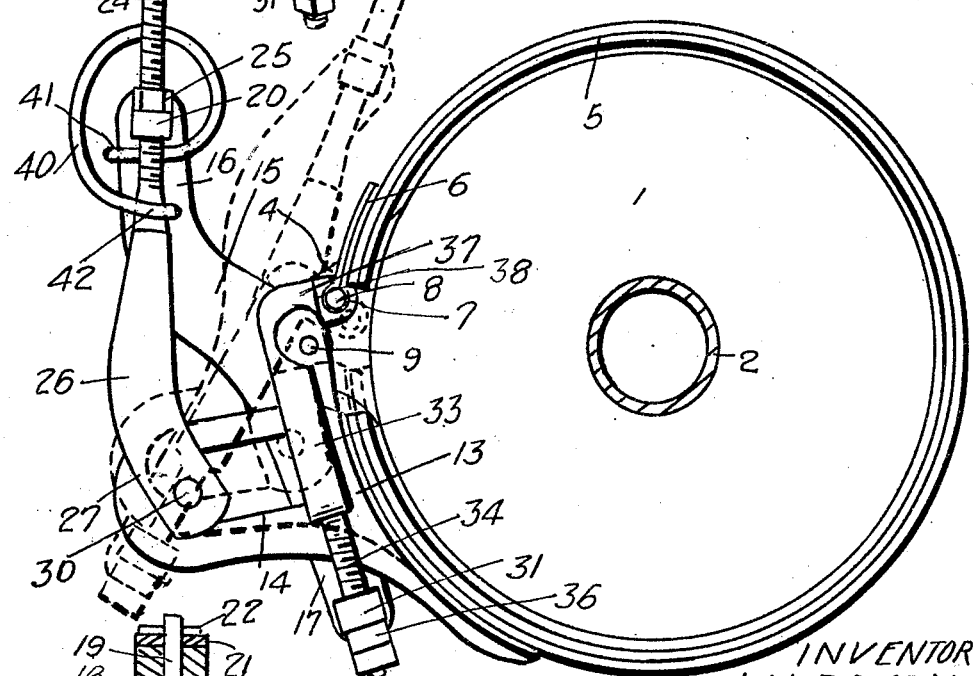
FIG.2.
FIG.3.
INVENTOR
J. N. DOYON
BY
ATTORNEYS.

Patented Feb. 17, 1925.

1,527,033

UNITED STATES PATENT OFFICE.

JOSEPH NAPOLEON DOYON, OF TORONTO, ONTARIO, CANADA.

BRAKE-BAND-OPERATING MECHANISM.

Application filed November 21, 1923. Serial No. 676,108.

*To all whom it may concern:*

Be it known that I, JOSEPH NAPOLEON DOYON, a subject of the King of Great Britain, and a resident of the city of Toronto, in the county of York, Province of Ontario, Canada, have invented certain new and useful Improvements in Brake-Band-Operating Mechanism, of which the following is a specification.

My invention relates to improvements in brake band operating mechanism, and the object of the invention is to devise means whereby the brake may be operated with a minimum effort to produce a maximum braking effect, and it consists essentially of the arrangement and construction of parts as hereinafter more particularly explained.

Fig. 1 is a perspective view of my braking mechanism applied to a brake drum and showing the parts in the position they assume when in the releasing position.

Fig. 2 is a side elevation of the parts shown in Fig. 1, the releasing position being shown in full lines and the braking position in dotted lines.

Fig. 3 is a sectional detail of one of the swivel connections between the main lever of my mechanism and the connecting links coacting therewith.

In the drawings like characters of reference indicate corresponding parts in each figure.

1 indicates a brake drum which is mounted upon a shaft or axle 2 to revolve therewith.

My device has been illustrated in the drawings as applied to the brake drum of an automobile, although it will of course be understood that my device may be used to coact with a brake drum used in any other connection, such as with a line shaft or shaft of a hoisting mechanism.

3 is a stationary circular plate which in the case of an automobile forms part of the rear axle housing so as to be carried thereby.

4 is a lug forming an extension of the plate 3, such lug forming the main support for my braking mechanism.

5 is a brake band which coacts with the drum 1 to produce the braking effect.

6 is a bearing piece provided with a sleeved end 7. The bearing piece 6 is secured by suitable means to one end of the brake band 5. The sleeved portion is provided with a central notch 7×.

8 is a pin which extends through the sleeved portion 7 across the notch 7× and is suitably secured therein.

9 is an operating shaft journalled in a bearing 10 forming part of the lug 4.

11 is an arm secured to the shaft 9, to the lower end 12 of which is secured a cable or any other suitable means by which the brake is operated from the manually operated lever located in the automobile or other suitable location from which the brake is to be operated.

13 is a plate secured to the brake band 5 so as to extend outwardly therefrom adjacent to the opposite end of the band. The plate 13 is provided with a slot 14, the upper edge of which is substantially radial to the centre of the drum 1.

It will be noted that the ends of the slot 14 are preferably semi-circular, as indicated at 14× and 14°.

15 is the main operating lever of my braking mechanism, the lever being mounted centrally upon the shaft 9 to turn therewith. The lever 15 is provided with an upwardly extending arm 16 and a downwardly extending arm 17. The upper end of the arm 16 is provided with a bearing sleeve 18, in which is journalled a swivel bolt 19, as illustrated in Fig. 3. The bolt 19 is provided with a rectangular head 20, and is secured at its opposite end within the bearing sleeve 18 by a washer and cotter pin 21 and 22 respectively. The head 20 is provided with an orifice 23.

24 is a draw bolt which extends through the orifice 23 and is provided with a nut 25 threaded thereon. The lower end of the bolt 24 is provided with a forked member 26, the arms 27 and 28 of which extend to each side of the plate 13 and of the slot 14.

29 is a roller journalled between the forked members 27 and 28 upon a pin 30. The roller 29 fits within the slot 14, a slight clearance being provided between the outer periphery of the roller and the edges of the slot 14.

31 is a rectangular head similar to the head 20 illustrated in Fig. 3, the head 31 being provided with a swivel bolt extending through a bearing sleeve 32 formed at the lower end of the lever arm 17.

33 is a link member provided at its lower end with a draw bolt portion 34 extending through the orifice 35 of the head 31. The draw bolt portion 34 is secured by means of a nut 36 threaded thereon against the head 31. The upper end of the link 33 is provided with an inward extension 37 which enters the notch 7* and is swung upon the pin 8. The extension 37 is provided intermediately of its length with an off-set portion 38 forming a shoulder 39 for a purpose which will hereinafter appear.

40 is a spring provided at one end with a loop 41 extending around the arm 16 of the lever 15 so as to bear against the outer edge of the arm. The spring 40 extends upward from the loop 41 and over the bearing 18 and downward to the outer side of the drawbolt 24, with which it engages by means of an end loop 42 which extends around the drawbolt 24.

Having described the principal parts of my invention I will now briefly describe the operation of the same.

When it is desired to set the brake, that is to draw the brake band 5 into contact with the drum 1, the lower end of the arm 11 is pulled in the direction of arrow (see Fig. 1) thereby turning the shaft 9 in a corresponding direction and turning the lever 15 so as to swing the arm 16 inward and the arm 17 outward. By this means a downward draw is exerted upon the link 33, pulling the upper portion of the brake band 5 downward and inward, and an upward draw upon the lower portion of the brake band by means of the drawbolt 24 and its connection to the plate 13 through the roller 29 and slot 14. As this upward draw is exerted, the plate 13 is lifted and the roller 29 carried inward, exerting an upward pull upon the plate so as to carry the corresponding arm of the brake band into contact with the brake drum. This operation is continued until the points forming the centre of the head 20 and the centre of the pin 30 carrying the roller 29 are substantially on dead centre when in the closed braking position with the centre of the operating shaft 9; also when the brake is in the closed position the point of draw between the brake drum and the brake band and the centre of the head 31 is on dead centre with the centre of the operating shaft 9, this movement being limited to prevent the parts passing the dead centre lines by means of the shoulder 39 with which the forked member 26 engages when in the dead centre position. If the pull upon the arm 11 is continued, the parts will not pass the dead centre point, but the force of the pressure is transmitted from the main lever through the forked member 26 bearing against the shoulder 39 to the upward extension 37 of the link member 33, so as to force the brake band end connected to the extension 37 inward into closer contact with the periphery of the drum, and thereby increase the braking effect.

When the arm 11 is released, the parts immediately resume their normal position by means of the spring 40, which swings the lower end of the forked member 26 outward, carrying the roller 29 to the outer end of the slot 14, permitting the lower portion of the brake band to release from contact with the drum, the upper end of the brake band releasing itself by its own tension by pulling upward upon the link 33, causing the lower end of such link and the lower arm of the main lever 15 to swing inward, this movement being aided by the tension of the spring 40.

From this description it will be seen that I have devised a brake band operating mechanism which when operated to draw the brake band into contact with the drum, carries its parts, to draw from each end of the brake band, into a dead centre position and therefore when the brake is in the closed position it may be held with a minimum amount of effort, the whole pressure of the operator being utilized to produce the braking effect, and thereby increasing the pressure exerted upon the drum to a maximum extent. At the same time by my mechanism the brake band may be drawn evenly into contact with the periphery of the drum, and therefore the whole surface of the drum is utilized as a braking surface.

What I claim as my invention is:

1. In a brake band operating mechanism, the combination with a brake drum and band, of a main lever swingably mounted upon a stationary support intermediately of its length, and having its outer end off-set whereby a line drawn from one end of the main lever to the other passes to the outside of the centre of swing of such main lever upon its support, and a link connection between the arms of the lever and the opposite ends of the brake band whereby the ends of the arms of the lever assume, with the point of pull upon each end of the brake band, a dead centre position with the centre of swing of the main lever when in the braking position.

2. In a brake band operating mechanism, the combination with a brake drum and brake band, of a main lever swung intermediately of its length upon a stationary support, means for swinging the lever, a substantially radially slotted plate extending outwardly from one end of the brake band, a swivel bolt carried by each arm of the lever, a link pivotally connected to one end of the brake band and extending at its opposite end diametrically through the swivel bolt and secured therein, a link member extending diametrically through the swivel bolt of the other arm of the lever, and a roller carried by the arm and engaging within the slot of the aforesaid plate, and yieldable resilient means for holding the parts in their normal position.

3. In a brake band operating mechanism, the combination with a brake drum and brake band coacting therewith, of a stationary support, a main lever mounted intermediately of its length upon such stationary support and manually operable, a link member having an inward extension at its upper end pivotally connected to one end of the brake band, a swivel connection between the opposite end of the link member and the lower arm of the main lever, a radially slotted plate carried by the opposite end of the brake band and extending outward therefrom, a forked member extending through each side of the slotted plate, a roller journalled within the fork of such member and located within the slot of the plate, turnable means for connecting the upper portion of the forked member to the upper end of the upper arm of the main lever, and spring means for holding the parts in their normal position.

4. In a brake band operating mechanism, the combination with a brake drum and brake band coacting therewith, of a stationary support, a main lever mounted intermediately of its length upon such stationary support and manually operable, a link member having an inward extension at its upper end pivotally connected to one end of the brake band, an off-set portion in such extension forming a shoulder, a swivel connection between the opposite end of the link member and the lower arm of the main lever, a radially slotted plate carried by the opposite end of the brake band and extending outward therefrom, a forked member extending through each side of the slotted plate and adapted to engage the aforesaid shoulder when in the braking position, a roller journalled within the fork of such forked member and located within the slot of the plate, turnable means connecting the upper portion of the forked member to the upper end of the upper arm of the main lever, and spring means for holding the parts in their normal position.

JOSEPH NAPOLEON DOYON.